(12) United States Patent
Tsutsumi et al.

(10) Patent No.: US 12,104,652 B2
(45) Date of Patent: Oct. 1, 2024

(54) POWER TRANSMISSION SHAFT AND METHOD FOR MANUFACTURING THE SAME

(71) Applicant: Hitachi Astemo, Ltd., Hitachinaka (JP)

(72) Inventors: Daiki Tsutsumi, Hitachinaka (JP); Yasushi Akita, Hitachinaka (JP); Kenichiro Ishikura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 724 days.

(21) Appl. No.: 17/291,048

(22) PCT Filed: Oct. 30, 2019

(86) PCT No.: PCT/JP2019/042522
§ 371 (c)(1),
(2) Date: May 4, 2021

(87) PCT Pub. No.: WO2020/095782
PCT Pub. Date: May 14, 2020

(65) Prior Publication Data
US 2021/0372482 A1    Dec. 2, 2021

(30) Foreign Application Priority Data
Nov. 5, 2018 (JP) ................. 2018-207843

(51) Int. Cl.
*F16D 1/10* (2006.01)
(52) U.S. Cl.
CPC ........ *F16D 1/101* (2013.01); *F16D 2001/103* (2013.01)

(58) Field of Classification Search
CPC ........ F16C 3/023; F16C 3/03; F16C 2202/02; F16C 2220/60; F16D 1/10; F16D 1/112; F16D 3/06; F16D 2001/103; F16D 2250/003; F16D 2250/0084;
(Continued)

(56) References Cited

U.S. PATENT DOCUMENTS

| 4,132,090 A | 1/1979 | McDermott |
| 10,240,641 B2 * | 3/2019 | Akita ................. F16C 3/023 |
| 10,352,365 B2 * | 7/2019 | Hiraoka ................. F16C 3/02 |

(Continued)

FOREIGN PATENT DOCUMENTS

| JP | S50-153395 A | 12/1975 |
| JP | S53-136796 A | 11/1978 |

(Continued)

OTHER PUBLICATIONS

International Search Report dated Dec. 24, 2019 issued in International Application No. PCT/JP2019/042522, with English translation, 5 pages.
(Continued)

*Primary Examiner* — Josh Skroupa
(74) *Attorney, Agent, or Firm* — Foley & Lardner LLP

(57) ABSTRACT

In a propeller shaft, a crowning portion of a male spline portion is provided in a predetermined range including a front end portion in an axial direction, and a tooth tip surface is shaped in such a manner that a tooth thickness thereof gradually increases from the front end portion toward an intermediate portion of the male spline portion in the axial direction.

15 Claims, 5 Drawing Sheets

(58) Field of Classification Search
CPC ......... Y10T 403/7026; Y10T 403/7028; Y10T 403/7035
USPC ............................... 403/359.1, 359.2, 359.6
See application file for complete search history.

(56) References Cited

U.S. PATENT DOCUMENTS

| | | | |
|---|---|---|---|
| 10,767,705 B2* | 9/2020 | Akita | ..................... F16D 3/06 |
| 11,365,765 B2* | 6/2022 | Akita | ..................... F16C 3/023 |
| 2008/0152424 A1 | 6/2008 | Igarashi et al. | |
| 2015/0125269 A1 | 5/2015 | Bois et al. | |
| 2019/0293129 A1* | 9/2019 | Nishinosono | ............. F16D 1/10 |
| 2020/0040946 A1 | 2/2020 | Akita et al. | |

FOREIGN PATENT DOCUMENTS

| | | | | |
|---|---|---|---|---|
| JP | H03-248737 A | | 11/1991 | |
| JP | H05-337736 A | | 12/1993 | |
| JP | 2007247769 A | * | 9/2007 | ............... F16D 1/06 |
| JP | 2009185872 A | * | 2/2008 | ............... F16D 1/06 |
| JP | 2010054027 A | * | 3/2010 | ............... F16D 1/06 |
| JP | 2012-002267 A | | 1/2012 | |
| WO | WO-2008029017 A2 | * | 3/2008 | ............. F16D 1/116 |
| WO | WO-2018/070180 | | 4/2018 | |

OTHER PUBLICATIONS

Written Opinion of the International Searching Authority dated Dec. 24, 2019 issued in International Application No. PCT/JP2019/042522, with English translation, 24 pages.

Official Communication dated Feb. 21, 2024 issued in DE Application No. 11 2019 005 527.5, with English translation, 24 pages.

* cited by examiner

POWER TRANSMISSION SHAFT AND METHOD FOR MANUFACTURING THE SAME

TECHNICAL FIELD

The present invention relates to a power transmission shaft and a method for manufacturing the power transmission shaft.

BACKGROUND ART

PTL 1 discloses a propeller shaft having a collapse (impact absorption) structure established by a male spline portion and a female spline portion as a power transmission shaft.

CITATION LIST

Patent Literature

PTL 1: International Publication No. 2018-070180

SUMMARY OF INVENTION

Technical Problem

There are needs toward the above-described conventional power transmission shaft for further stabilization of a collapse load, which is a load of insertion of the male spline portion into the female spline portion at the time of a collision.

Solution to Problem

One of objects of the present invention is to provide a power transmission shaft capable of further stabilizing a collapse load and a method for manufacturing the power transmission shaft.

In a power transmission shaft according to one aspect of the present invention, a crowning portion of a second spline portion is provided in a predetermined range including a second spline first end portion in a direction of a rotational axis of a second shaft member, and a second spline tooth tip surface is shaped in such a manner that a tooth thickness thereof gradually increases from the second spline first end portion toward an intermediate portion of the second spline portion in the direction of the rotational axis of the second shaft member.

Advantageous Effects of Invention

Therefore, according to the one aspect of the present invention, the collapse load can be further stabilized.

DESCRIPTION OF EMBODIMENTS

Figure 1:
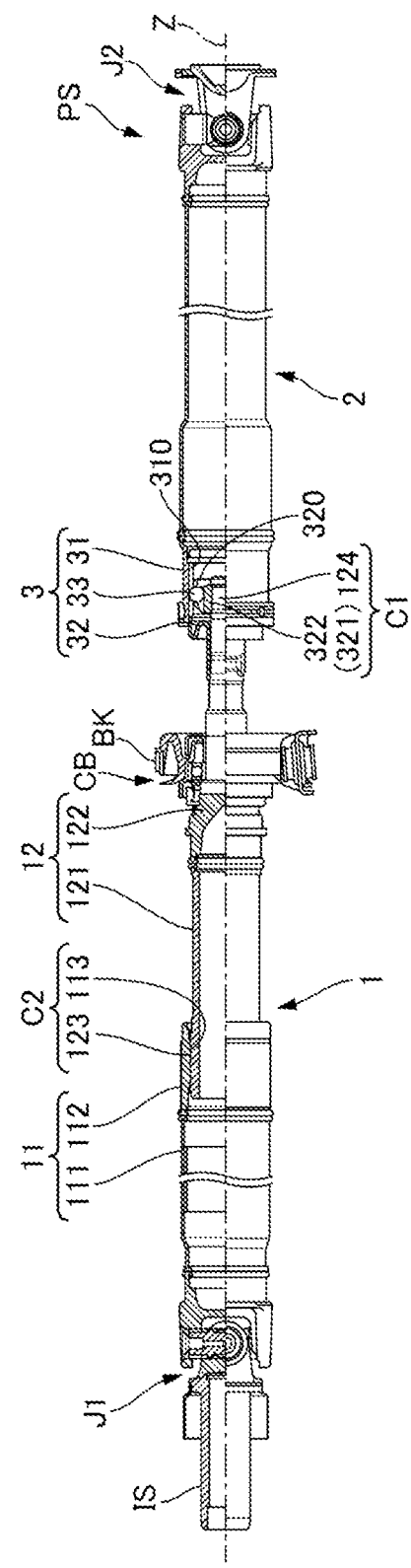
FIG. 1 is a half vertical cross-sectional view of a propeller shaft PS according to a first embodiment.

[First Embodiment] FIG. 1 is a half vertical cross-sectional view of a propeller shaft PS according to a first embodiment.

The propeller shaft PS is a power transmission shaft provided between a drive source and a drive wheel of a vehicle, and transmits a rotational force of the drive source to the drive wheel. In the following description, the present embodiment will be described referring to the left side in FIG. 1, i.e., the front side of the vehicle as "front" and the right side in FIG. 1, i.e., the rear side of the vehicle as "rear". Further, the direction extending along a rotational axis Z of the propeller shaft PS, a radial direction of the rotational axis Z, and a direction around the rotational axis Z will be referred to as an "axial direction", a "radial direction", and a "circumferential direction", respectively.

The propeller shaft PS includes a first shaft 1, a second shaft 2, and a constant-velocity joint 3. The first shaft 1 transmits the drive force of the not-illustrated drive source. The second shaft 2 rotates integrally with the first shaft 1 by the drive force transmitted from the first shaft 1. The constant-velocity joint 3 integrally rotatably couples the first shaft 1 and the second shaft 2.

The first shaft 1 is integrally rotatably coupled at the front end portion thereof with an input shaft IS linked with a not-illustrated gearbox (a transmission) via a first cross joint J1, which corresponds to a first shaft joint, and is also rotatably supported at the rear end portion thereof via a center bearing CB suspended on a not-illustrated vehicle body using a known bracket BK. The first shaft 1 is formed in a manner axially divided into two members, a cylindrical first shaft member 11 arranged on the front side and a cylindrical second shaft member 12 arranged on the rear side. The first shaft member 11 and the second shaft member 12 are coupled with the aid of meshing (spline fitting) between a female spline portion 113 and a male spline portion 123, which will be described below. A second collapse portion C2, which will be described below, is formed by this spline fitting. The direction of the rotational axis of the first shaft member 11 matches the direction of the rotational axis Z of the propeller shaft PS. The first shaft member 11 includes a cylinder member 111 and an outer cylinder member 112. The cylinder member 111 has a relatively thin cylindrical shape, and is joined at the front end thereof to the first cross joint J1 by friction welding. The outer cylinder member 112 has a relatively thick cylindrical shape, and is joined at the front end thereof to the rear end of the cylinder member 111 by friction welding.

The direction of the rotational axis of the second shaft member 12 matches the direction of the rotational axis Z of the propeller shaft PS. The second shaft member 12 is made of a seamless pipe with no seam present in the circumferential direction. The second shaft member 12 includes an inner cylinder member 121 and a shaft-shaped member 122. The inner cylinder member 121 has a cylindrical shape relatively large in diameter, and is coupled at the front end thereof with the first shaft member 11 by spline fitting. The shaft-shaped member 122 has a shaft shape having a relatively small diameter reducing toward the rear end side in a stepwise manner, and is joined at the front end thereof to the rear end of the inner cylinder member 121 by friction welding. The second shaft 2 is integrally rotatably coupled at the rear end thereof with a not-illustrated output shaft linked with a not-illustrated differential mechanism (a differential) via a second cross joint J2, which corresponds to a second shaft joint.

The constant-velocity joint 3 includes an outer race member 31, an inner race member 32, and a plurality of balls 33. The outer race member 31 is cylindrically formed, and is provided at the front end portion of the second shaft 2. The inner race member 32 is cylindrically formed, and is provided on the outer peripheral side of the rear end portion of the shaft-shaped member 122 and arranged on the inner peripheral side of the outer race member 31 so as to face it. The plurality of balls 33 is rollably disposed between the outer race member 31 and the inner race member 32.

An axial groove 310 is formed linearly along the axial direction by cutout processing on the inner peripheral side of the outer race member 31. The axial groove 310 restricts a circumferential relative movement between the outer race member 31 and the inner race member 32 based on engagement of the balls 33 while permitting an axial relative movement between the outer race member 31 and the inner race member 32 based on rolling movements of the balls 33.

A shaft insertion hole 321 is formed on the inner peripheral side of the inner race member 32 so as to extend therethrough along the inner axial direction. A female spline portion 322 is formed along the axial direction by cutout processing on the inner peripheral side of the shaft insertion hole 321. A male spline portion 124 is formed by cutout processing on the outer peripheral side of the rear end portion of the shaft-shaped member 122. The male spline portion 124 is fitted into the female spline portion 322 from the axial direction. Further, an axial groove 320 is formed along the axial direction by cutout processing on the outer peripheral side of the inner race member 32. The axial groove 320 is formed in a similar manner to the axial groove 310 of the outer race member 31.

The male spline portion 124 of the shaft-shaped member 122 and the female spline portion 322 of the inner race member 32 form a first collapse portion C1, which establishes a so-called collapse mechanism. More specifically, bending and deformation of the propeller shaft PS when the vehicle collides is suppressed due to a relative movement between the shaft-shaped member 122 and the inner race member 32 in a compression direction via both the spline portions 124 and 322 based on a collision load input from the longitudinal direction when the vehicle collides.

Figure 2:
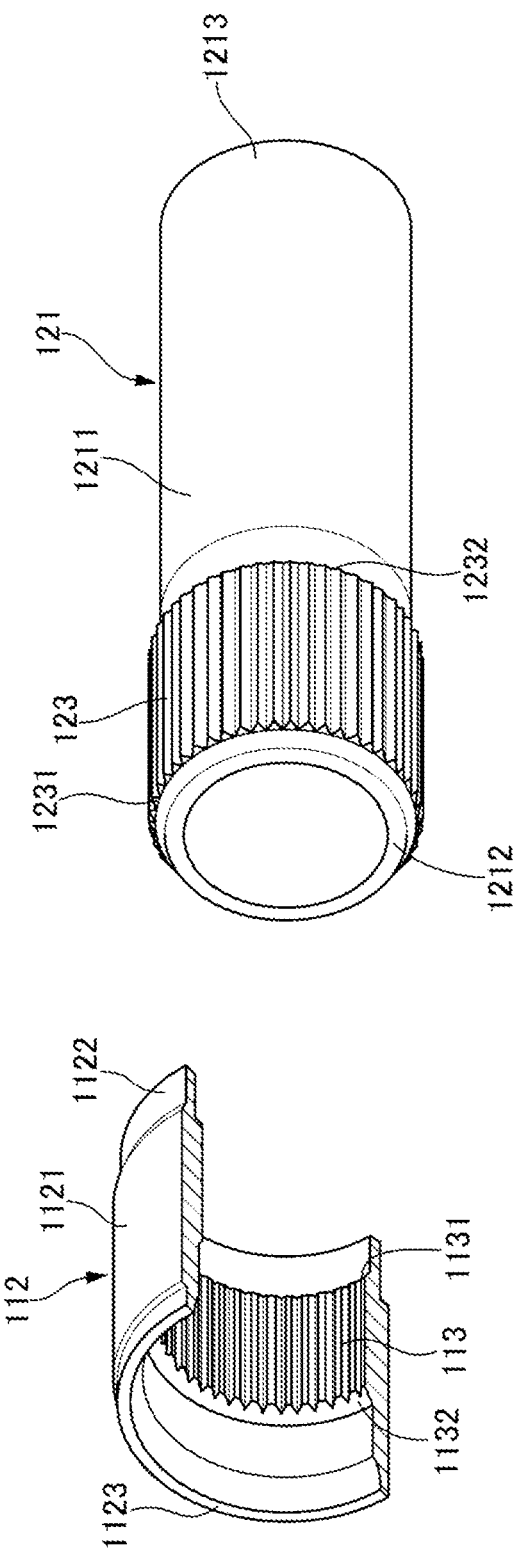
FIG. 2 is a perspective view illustrating an outer cylinder member 112 and an inner cylinder member 121 before they are assembled.
Figure 3:
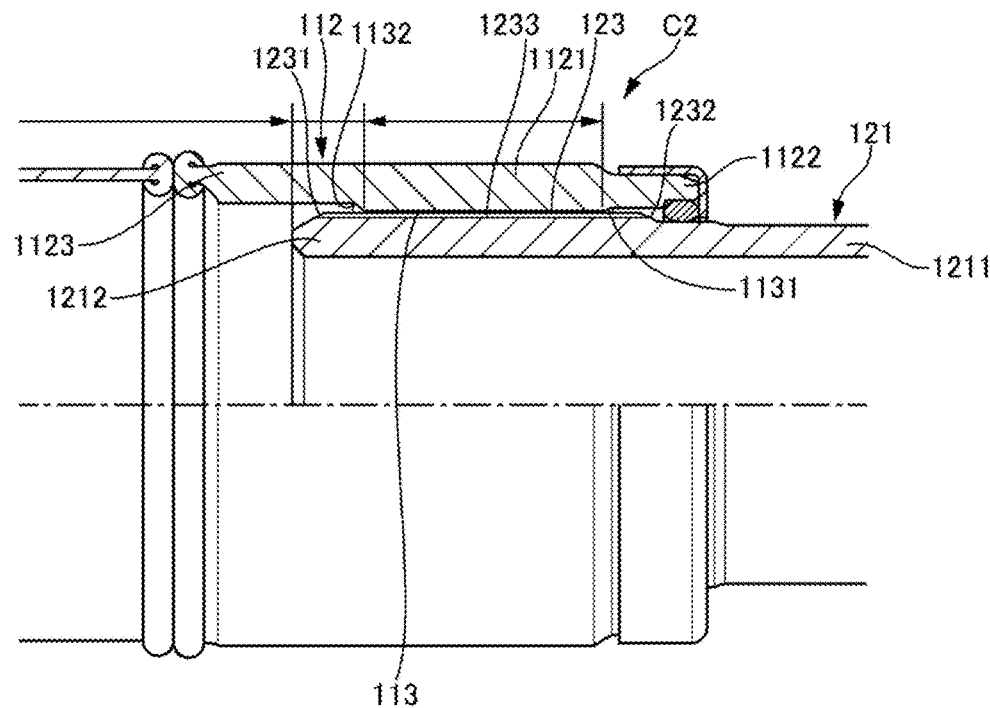
FIG. 3 is a half vertical cross-sectional view illustrating main portions of a second collapse portion C2.

FIG. 2 is a perspective view illustrating the outer cylinder member 112 and the inner cylinder member 121 before they are assembled, and FIG. 3 is a half vertical cross-sectional view of main portions of the second collapse portion C2.

The outer cylinder member 112 includes an outer cylinder member main body portion 1121 and a female spline portion (a first spline portion) 113. The outer cylinder member main body portion 1121 has a cylindrical shape. The outer cylinder member main body portion 1121 has a rear end portion (an outer cylinder member first end portion) 1122 and a front end portion (an outer cylinder member second end portion) 1123. Then, the female spline portion 113 is provided on the inner peripheral side of the outer cylinder member main body portion 1121 in a predetermined range including the rear end portion 1122 of these two end portions in the axial direction. A rear end portion 1131 of the female spline portion 113 (a female spline first end portion or a first spline first end portion) is provided on the rear side with respect to a front end portion 1132 (a female spline second end portion or a first spline second end portion). The inner cylinder member 121 is press-fitted into the outer cylinder member 112 from the rear end portion 1122 side.

The inner cylinder member 121 includes an inner cylinder member main body portion 1211 and a male spline portion (a second spline portion) 123. The inner cylinder member main body portion 1211 has a cylindrical shape. The inner cylinder member main body portion 1211 has a front end portion (an inner cylinder member first end portion) 1212 and a rear end portion (an inner cylinder member second end portion) 1213. Then, the male spline portion 123 is provided on the outer peripheral side of the inner cylinder member main body portion 1211 in a predetermined range including the front end portion 1212 of these two end portions in the axial direction. A front end portion 1231 of the male spline portion 123 (a male spline first end portion or a second spline first end portion) is provided on the front side with respect to a rear end portion 1232 (a male spline second end portion or a second spline second end portion). The inner cylinder member 121 is press-fitted into the outer cylinder member 112 from the front end portion 1231 side. As illustrated in FIG. 3, the front end portion 1231 of the male spline portion 123 is located on the front side with respect to the front end portion 1132 of the female spline portion 113, and the rear end portion 1232 of the male spline portion 123 is located on the rear side with respect to the rear end portion 1131 of the female spline portion 113. In other words, the axial length of the male spline portion 123 is longer than the length of the female spline portion 113.

Figure 4:
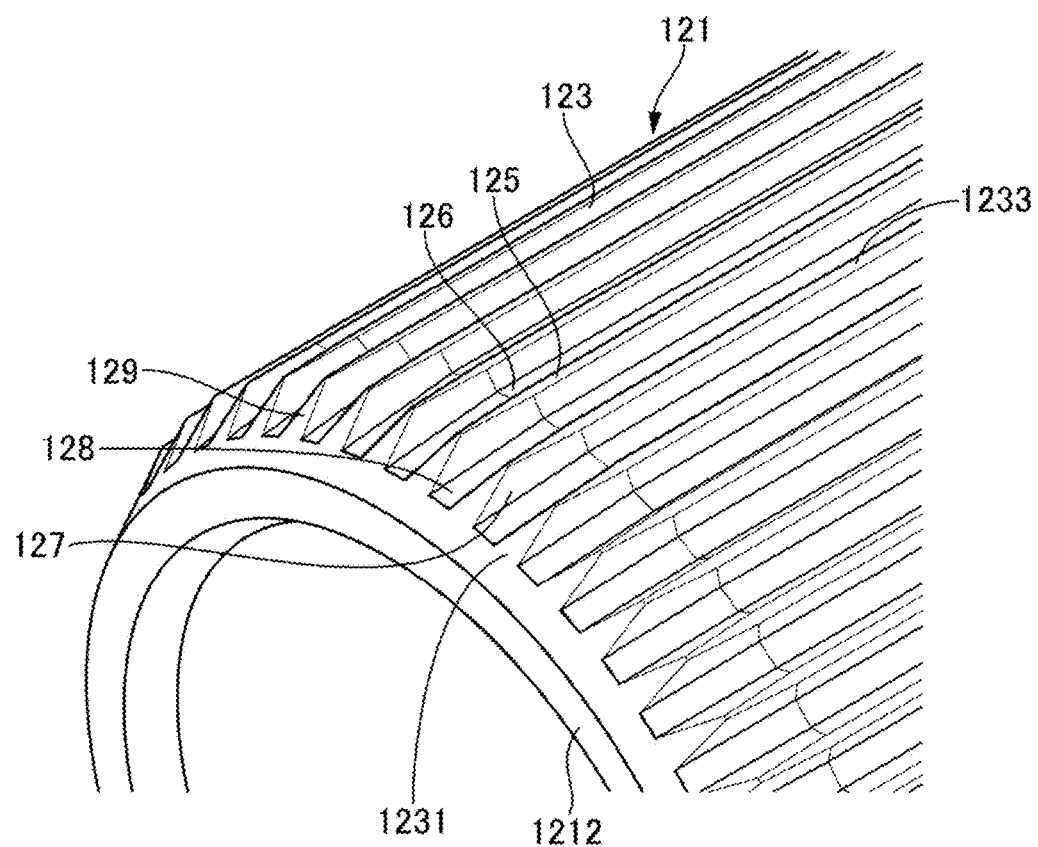
FIG. 4 is a perspective view of main portions of the inner cylinder member 121.

FIG. 4 is a perspective view of main portions of the inner cylinder member 121.

The male spline portion 123 includes a tooth tip surface (a second spline tooth tip surface) 125, a tooth root surface (a second spline tooth root surface) 126, and a crowning portion 127. The crowning portion 127 is provided in a predetermined range including the front end portion 1231 in the axial direction. The crowning portion 127 is shaped in such a manner that the tooth thickness of the tooth tip surface 125 gradually increases from the front end portion 1231 toward an intermediate portion 1233 of the male spline portion 123 in the axial direction. Further, the crowning portion 127 is formed in such a manner that the tooth thickness of the tooth tip surface 125 at the front end portion 1212 is larger than zero. In other words, two corner portions are generated at the distal end portion of the tooth tip surface 125, and each of the corner portions has an obtuse angle. The crowning portion 127 is formed in such a manner that the entire axial range thereof is located outside the female spline portion 113 (the front side with respect to the front end portion 1132) with the inner cylinder member 121 press-fitted in the outer cylinder member 112.

The inner cylinder member 121 includes an inner cylinder member taper portion 128. The inner cylinder member taper portion 128 is provided in a predetermined range that is located on the front side of the tooth root surface 126 and includes the front end portion 1212 in the axial direction. The inner cylinder member taper portion 128 has such a taper shape that the outer diameter of the inner cylinder member main body portion 1211 on the tooth root surface 126 gradually increases from the front end portion 1212 toward the rear end portion 1213. The crowning portion 127 is formed in a range not overlapping the inner cylinder member taper portion 128. In other words, the crowning portion 127 is not provided on the inner cylinder member taper portion 128.

The inner cylinder member 121 includes a second spline taper portion 129. The second spline taper portion 129 is provided in a predetermined range including the front end portion 1231 in the axial direction. The second spline taper portion 129 has such a taper shape that the outer diameter of the tooth tip surface 125 gradually increases from the front end portion 1212 toward the rear end portion 1213. The axial length of the second spline taper portion 129 is shorter than the length of the crowning portion 127.

Figure 5:
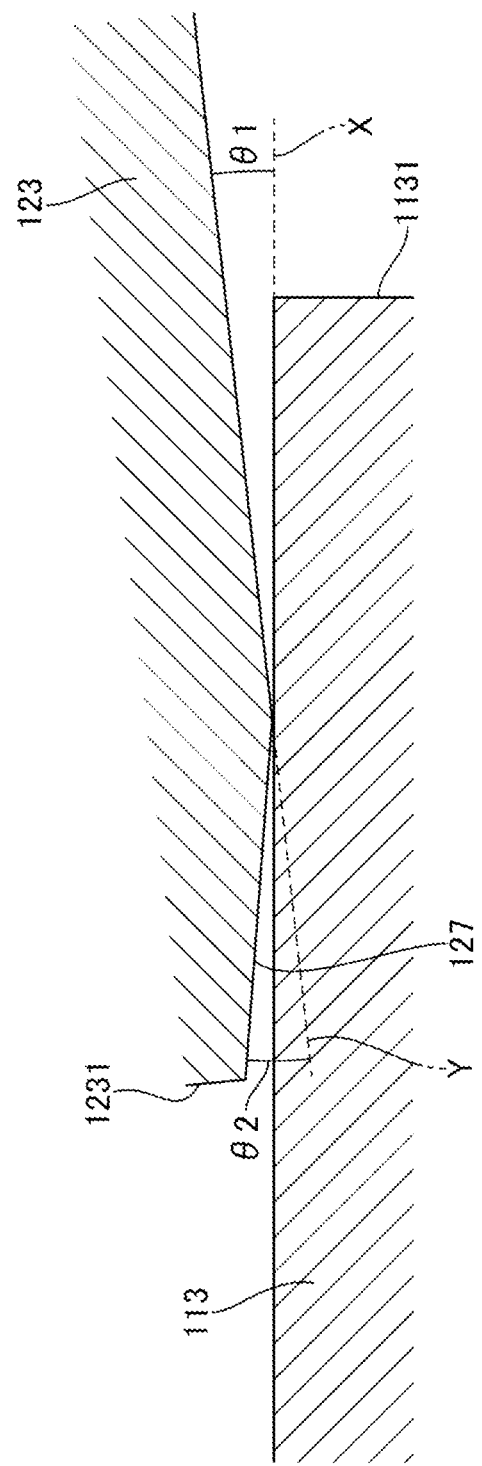
FIG. 5 illustrates a female spline portion 113 and a male spline portion 123 as viewed from a radially outer side when the inner cylinder member 121 is press-fitted in the outer cylinder member 112.

FIG. 5 illustrates the female spline portion 113 and the male spline portion 123 as viewed from the radially outer side when the inner cylinder member 121 is press-fitted in the outer cylinder member 112.

As illustrated in FIG. 5, the female spline portion 113 is shaped in such a manner that the longitudinal direction thereof extends along the axial direction. On the other hand, the male spline portion 123 has such a spline shape that the longitudinal direction thereof is inclined with respect to the axial direction. Assume that a helical angle (a first angle) $\theta 1$ refers to a minor angle of angles sandwiched between an axis X extending along the axial direction and an axis extending along the longitudinal direction of the male spline portion 123 in a plane including the tooth tip surface 125. Further, assume that a crowning angle (a second angle) $\theta 2$ refers to a minor angle of angles sandwiched between an axis Y extending along the longitudinal direction of the male spline portion 123 and a tangential line of the outer edge of the crowning portion 127. In this case, the crowning portion 127 is shaped in such a manner that the crowning angle $\theta 2$ is larger than the helical angle $\theta 1$. In a case where the crowning portion 127 has a circular-arc shape, the crowning angle $\theta 2$ can be calculated with use of a tangential line of the outer edge of the crowning portion 127 at the middle portion (a bisection point) of the crowning portion 127 in the axial direction of the second shaft member 12.

Next, a method for manufacturing the propeller shaft PS will be described especially focusing on a method for forming the inner cylinder member taper portion 128, a method for forming the crowning portion 127, and a method for press-fitting the inner cylinder member 121 into the outer cylinder member 112 in this manufacturing method.

The inner cylinder member taper portion 128 is formed by an inner cylinder member taper portion formation step. In the inner cylinder member taper portion formation step, the inner cylinder member taper portion 128 is formed in such a manner that the outer diameter of the inner cylinder member main body portion 1211 on the tooth root surface 126 gradually increases from the front end portion 1212 toward the rear end portion 1213 in the predetermined range including the front end portion 1212 in the axial direction of the inner cylinder member 121.

The crowning portion 127 is formed by a crowning portion formation step. The crowning portion formation step is performed after the inner cylinder member taper portion formation step. In the crowning portion formation step, the crowning portion 127 is formed by hobbing in such a manner that the thickness of the tooth tip surface 125 gradually increases from the front end portion 1231 toward the intermediate portion 1233 in the predetermined range including the front end portion 1231 in the axial direction of the inner cylinder member 121. The crowning portion formation step is successively performed since the start of contact to the inner cylinder member 121 until the separation therefrom. In other words, in the crowning portion formation step, all of the circumferentially placed plurality of male spline portions 123 are successively formed. Further, the crowning portion formation step is performed in a process of moving a hob used for the hobbing from the front end portion 1231 in a direction toward the rear end portion 1232.

The inner cylinder member 121 is press-fitted into the outer cylinder member 112 by a press-fitting step. The press-fitting step is performed after the crowning portion formation step. In the press-fitting step, the front end portion 1212 of the inner cylinder member 121 is inserted from the rear end portion 1122 of the outer cylinder member 112, and the inner cylinder member 121 is press-fitted into the outer cylinder member 112 until the female spline portion 113 and the male spline portion 123 are meshed with each other.

Figure 6:
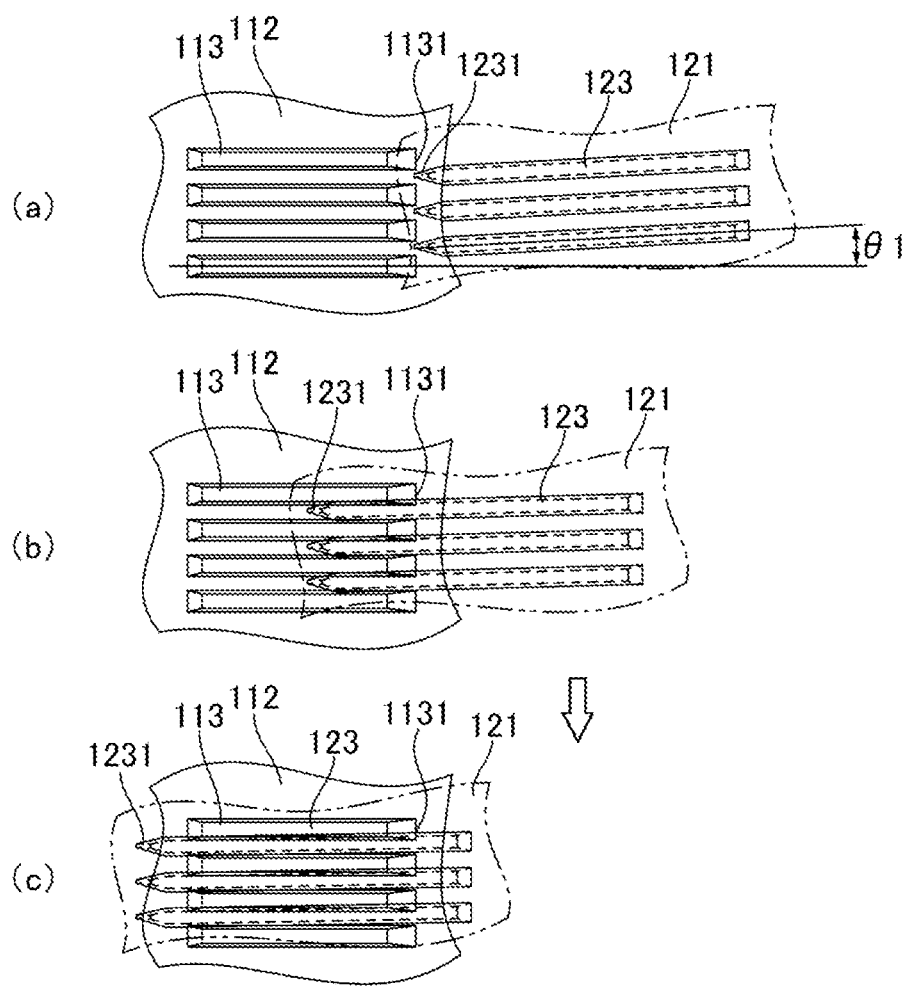
FIG. 6 illustrate a press-fitting step.

FIG. 6 illustrate the press-fitting step. A solid line in the drawing indicates the outer cylinder member 112, and a long dashed double-short dashed line indicates the inner cylinder member 121.

More specifically, as illustrated in FIG. 6(*a*), the rear end portion 1131 of the female spline portion 113 and the front end portion 1231 of the male spline portion 123 are brought into abutment with each other. Subsequently, as illustrated in FIG. 6(*b*), the male spline portion 123 is inserted into the outer cylinder member 112 as if being twisted in a direction indicated by an arrow in FIG. 6(*b*) from the state in which the relative angle (the helical angle $\theta 1$) is generated between the female spline portion 113 and the male spline portion 123. As a result, the tooth of the male spline portion 123 is elastically deformed as if being twisted in the tooth width direction, and is fitted to the tooth of the adjacent female spline portion 113 in pressure contact therewith. Then, as illustrated in FIG. 6(*c*), when the female spline portion 113 and the male spline portion 123 are fitted to each other in the entire axial direction, the coupling between the outer cylinder member 112 and the inner cylinder member 121, i.e., the coupling between the first shaft member 11 and the second shaft member 12 is completed.

In the second collapse portion C2, the tooth of the male spline portion 123 is twisted and deformed in the tooth width direction by an amount corresponding to the inclination, by which the female spline portion 113 and the male spline portion 123 are fitted to each other. At this time, the tooth of the male spline portion 123 is inserted (press-fitted) in the groove between the female spline portions 113 and 113 adjacent to each other in the range of the elastic deformation region. More specifically, the tooth of the male spline portion 123 is brought into pressure contact with the tooth of the female spline portion 113 circumferentially adjacent thereto to generate a predetermined frictional force with the aid of a resilience force based on the elastic deformation of the male spline portion 123, by which the axial position between the first shaft member 11 and the second shaft member 12 is maintained. When the vehicle collides, the bending and deformation of the propeller shaft PS is suppressed due to the relative movement between the first shaft member 11 and the second shaft member 12 in the compression direction via both the spline portions 113 and 123 similarly to the first collapse portion C1.

Next, the functions and effects of the propeller shaft PS according to the first embodiment will be described.

It is imperative to stabilize the friction and stabilize the tightening margins of both the spline portions to manage the collapse load within a constant width in the propeller shaft having the collapse structure in which the male spline portion is press-fitted and engaged in the female spline portion. However, the press-fitting engagement between iron members may lead to a considerable change in the friction because the tooth surfaces bite each other at the time of the press-fitting, thereby resulting in an increase in the collapse load. This raises needs toward the conventional propeller shaft for the stabilization of the collapse load. Under these circumstances, in the propeller shaft PS according to the first embodiment, the crowning portion 127 of the male spline portion 123 is provided in the predetermined range including the front end portion 1231 in the axial direction, and the tooth tip surface 125 is shaped in such a manner that the tooth thickness thereof gradually increases from the front end portion 1231 toward the intermediate portion 1233 in the axial direction of the male spline portion 123. During the press-fitting of the inner cylinder member 121 into the outer cylinder member 112, when the female spline portion 113 and the male spline portion 123 start being meshed with each other, first, the front end portion 1231 and the rear end portion 1131 overlap each other, and, next, the front end portion 1231 is gradually press-fitted into the female spline portion 113. At this time, the crowning portion 127 is provided at the front end portion 1231 of the male spline portion 123, and this provision prevents the interference between the front end portion 1231 and the rear end portion 1131 when they start being meshed with each other, thereby allowing the female spline portion 113 and the male spline portion 123 to be smoothly meshed with each other. As a result, the present configuration succeeds in stabilizing a load of the press-fitting of the male spline portion 123 into the female spline portion 113 (the collapse load), thus succeeding in stabilizing the stroke load when the propeller shaft PS is compressed by receiving an axial load when the vehicle collides.

The longitudinal direction of the female spline portion 113 has a shape extending along the axial direction, and the longitudinal direction of the male spline portion 123 has a spline shape inclined with respect to the axial direction. The relative angle is generated between the longitudinal directions of these spline portions 113 and 123 in this manner, and this causes these spline portions 113 and 123 to be fitted to each other with the teeth thereof twisted and deformed, thereby contributing to improving the strength of the fitting between these spline portions 113 and 123. As a result, the present configuration can acquire an appropriate press-fitting load, thereby acquiring a sufficient coupling force between the outer cylinder member 112 and the inner cylinder member 121. Further, the female spline portion 113 side, which is difficult to form compared to the male spline portion 123, is shaped so as to extend in the axial direction, which brings about a merit of facilitating the processing of the female spline portion 113.

The crowning portion 127 is shaped in such a manner that the crowning angle $\theta 2$ is larger than the helical angle $\theta 1$, assuming that the helical angle $\theta 1$ refers to the minor angle of the angles sandwiched between the axis X extending along the axial direction and the axis extending along the longitudinal direction of the male spline portion 123, and the crowning angle $\theta 2$ refers to the minor angle of the angles sandwiched between the axis Y extending along the longitudinal direction of the male spline portion 123 and the tangential line of the outer edge of the crowning portion 127 in the plane including the tooth tip surface 125. Forming the crowning portion 127 so as to satisfy $\theta 2 > \theta 1$ can contribute to preventing the interference between the front end portion 1231 and the rear end portion 1131 when they start overlapping each other.

The male spline portion 123 is formed in such a manner that the axial length thereof is longer than the axial length of the female spline portion 113, and the crowning portion 127 is formed in such a manner that the entire axial range thereof is located outside the female spline portion 113 with the inner cylinder member 121 press-fitted in the outer cylinder member 112. In the male spline portion 123, the tooth thickness of the tooth tip surface 125 is thin and the female spline portion 113 and the male spline portion 123 are less meshed with each other in the region where the crowning portion 127 is provided. Therefore, the present configuration can prevent a reduction in the force of meshing between the female spline portion 113 and the male spline portion 123 by placing the crowning portion 127 outside the region where the female spline portion 113 and the male spline portion 123 are meshed with each other.

The second shaft member 12 is the inner cylinder member 121. Because the male spline portion 123 is provided on the outer peripheral side of the inner cylinder member main body portion 1211, the inner cylinder member 121 allows the crowning portion 127 to be easily formed compared to when the crowning processing is applied to the female spline portion 113 provided on the inner peripheral side of the outer cylinder member main body portion 1121.

The inner cylinder member taper portion 128 is provided in the predetermined range including the front end portion 1212 in the axial direction, and has such a taper shape that the outer diameter of the inner cylinder member main body portion 1211 on the tooth root surface 126 gradually increases from the front end portion 1212 toward the rear end portion 1213. Due to this configuration, the tooth tip surface of the female spline portion 113 and the tooth root surface 126 of the male spline portion 123 can be prevented from interfering with each other with the rear end portion 1131 and the front end portion 1231 overlapping each other, and therefore the male spline portion 123 can be smoothly introduced into the female spline portion 113.

The crowning portion 127 is formed in the range not overlapping the inner cylinder member taper portion 128. In other words, the present configuration ensures that the inner cylinder member taper portion 128 remains, thereby allowing the male spline portion 123 to be smoothly introduced into the female spline portion 113.

The second spline taper portion 129 of the male spline portion 123 is provided in the predetermined range including the front end portion 1231 in the axial direction. The tooth tip surface 125 has such a taper shape that the outer diameter thereof gradually increases from the front end portion 1212 toward the rear end portion 1213. The crowing portion 127 is formed in such a manner that the axial length thereof is longer than the axial length of the second spline taper portion 129. In the course of press-fitting the male spline portion 123 into the female spline portion 113, the crowning portion 127 still remains when the rear end portion 1131 has passed through the second spline taper portion 129. In this state, because the tooth tip surface 125 already reaches the maximum outer diameter thereof while the crowning portion 127 still maintains the excellent insertability of the male spline portion 123 into the female spline portion 113, the tooth tip surface 125 serves as a guide surface and the inner cylinder member 121 is prevented from tilting with respect to the outer cylinder member 112. The present configuration leads to the press-fitting of the inner cylinder member 121 with the inner cylinder member 121 prevented from tilting with respect to the outer cylinder member 112 in this manner, thereby being able to further improve the work of press-fitting the inner cylinder member 121 into the outer cylinder member 112.

The crowning portion 127 is formed in such a manner that the tooth thickness of the tooth tip surface 125 at the front end portion 1212 is equal to or greater than a predetermined value. Now, hypothetically supposing that the crowning portion 127 is formed in such a manner that the tooth thickness of the tooth tip surface 125 at the front end portion 1212 is zero, i.e., the distal end portion of the tooth tip surface 125 has an acute angle, this acute-angled distal end portion would be easily hooked on the female spline portion 113, thereby ending up impeding the smoothness at the start of the meshing between the female spline portion 113 and the male spline portion 123. Therefore, the tooth tip surface 125 is formed in such a manner that the tooth thickness of the distal end portion thereof is equal to or greater than the predetermined value, by which the two corner portions are generated at the distal end portion of the tooth tip surface 125 and each of the corner portions has an obtuse angle. This makes it difficult for these corner portions and the female spline portion 113 to be hooked with each other even when they contact each other, thereby realizing smooth meshing between the female spline portion 113 and the male spline portion 123.

The second shaft member 12 is made of a seamless pipe with no seam present in the circumferential direction. Now, hypothetically supposing that the second shaft member 12 is made of a so-called electric resistance welded steel pipe, which is prepared by roll-forming a steel strip and welding the seam, the seam welded portion corresponding to the seam would have higher hardness than the other portion, making the formation of the crowning portion 127 difficult. Especially, if the hardness is different only at a part of the second shaft member 12, the finished result may be changed only at the portion having the different hardness in a case where the machining processing is successively performed. Therefore, the present configuration can prevent the occurrence of the above-described problem by forming the second shaft member 12 using a seamless pipe.

The method for manufacturing the propeller shaft PS includes the crowning portion formation step of forming the crowning portion 127 in such a manner that the tooth thickness of the tooth tip surface 125 gradually increases from the front end portion 1231 toward the intermediate portion 1233 of the male spline portion 123 in the predetermined range including the front end portion 1231 in the axial direction, and the press-fitting step of inserting the front end portion 1212 of the inner cylinder member 121 from the rear end portion 1122 of the outer cylinder member 112 and press-fitting the inner cylinder member 121 into the outer cylinder member 112 until the female spline portion 113 and the male spline portion 123 are meshed with each other. In the press-fitting step, the provision of the crowning portion 127 prevents the interference between the front end portion 1231 and the rear end portion 1131 when they start being meshed with each other, thereby allowing the female spline portion 113 and the male spline portion 123 to be smoothly meshed with each other. As a result, the present configuration succeeds in stabilizing the collapse load, thus succeeding in stabilizing the stroke load when the propeller shaft PS is compressed by receiving an axial load when the vehicle collides.

The crowning portion 127 is formed by hobbing. The present method forms the circumferentially placed plurality of crowning portions 127 successively using the hob, thereby allowing the individual crowning portions 127 to have uniform shapes and sizes. The crowning portion formation step is successively performed since the hob used for the hobbing contacts the second shaft member 12 until the hob separates therefrom. In other words, the present method successively forms all of the circumferentially placed plurality of crowning portions 127, thereby allowing the individual crowning portions 127 to have further uniform shapes and sizes.

The crowning portion formation step forms the crowning portion 127 in the process of the movement of the hob from the front end portion 1231 in the direction toward the rear end portion 1232. Now, hypothetically supposing that the crowning portion 127 is formed in the process of a movement of the hob from the rear end portion 1232 in a direction toward the front end portion 1231, a burr and chips might be generated at the front end portion 1231 because generated chips are collected to the front end portion 1231. On the other hand, the present method forms the crowning portion 127 in the process of the movement of the hob from the front end portion 1231 in the direction toward the rear end portion 1232, thereby being able to prevent the occurrence of a burr at the front end portion 1231.

The method for manufacturing the propeller shaft PS further includes the inner cylinder member taper portion formation step of forming the inner cylinder member taper portion 128 shaped in such a manner that the outer diameter of the inner cylinder member main body portion 1211 on the tooth root surface 126 gradually increases from the front end portion 1212 toward the rear end portion 1213 in the predetermined range including the front end portion 1212 of the inner cylinder member 121 in the axial direction, and the crowning portion formation step is performed after the inner cylinder member taper portion formation step is performed. Now, hypothetically supposing that the inner cylinder member taper portion 128 is formed after the crowning portion 127 is performed, the surface of the formed crowning portion 127 might incur damage when the inner cylinder member taper portion 128 is formed. The presence of damage on the surface of the crowning portion 127 may impede the smooth introduction of the male spline portion 123 into the female spline portion 113 because the other member may be hooked with this damage when the male spline portion 123 is introduced into the female spline portion 113. Therefore, the occurrence of the above-described problem can be prevented by forming the crowning portion 127 after forming the inner cylinder member taper portion 128.

[Other Embodiments] Having described the embodiment for implementing the present invention, the specific configuration of the present invention is not limited to the configuration of the embodiment, and the present invention also includes even a design modification and the like thereof made within a range that does not depart from the spirit of the present invention, if any.

The first embodiment has been described referring to the example in which the female spline portion and the male spline portion correspond to the first spline portion and the second spline portion, respectively, but the male spline portion and the male spline portion may correspond to the first spline portion and the second spline portion, respectively.

The crowning portion according to the present invention is not limited to the crowning portion provided on the ends on the both sides in the longitudinal direction, and also includes a crowning portion provided at an end on only one side.

In the following description, technical ideas recognizable from the above-described embodiment will be described.

A power transmission shaft, according to one configuration thereof, is provided between a drive source and a drive wheel of a vehicle and is configured to transmit a rotational force of the drive source to the drive wheel. The power transmission shaft includes an outer cylinder member. The outer cylinder member includes an outer cylinder member main body portion and a female spline portion. The outer cylinder member main body portion has a cylindrical shape. The outer cylinder member main body portion includes an outer cylinder member first end portion and an outer cylinder member second end portion as a pair of end portions thereof, and the female spline portion is provided on an inner peripheral side of the outer cylinder member main body portion in a predetermined range including the outer cylinder member first end portion of these end portions. The female spline portion includes a female spline first end portion and a female spline second end portion as a pair of end portions of the female spline portion in a direction of a rotational axis of the outer cylinder member. The female spline first end portion is provided at a position closer to the outer cylinder member first end portion than the female spline second end portion is. The outer cylinder member is arranged with an inner cylinder member press-fitted from the outer cylinder member first end portion. The power transmission shaft further includes the inner cylinder member. The inner cylinder member includes an inner cylinder member main body portion and a male spline portion. The inner cylinder member main body portion has a cylindrical shape. The inner cylinder member main body portion includes an inner cylinder member first end portion and an inner cylinder member second end portion as a pair of end portions thereof, and the male spline portion is provided on an outer peripheral side of the inner cylinder member main body portion in a predetermined range including the inner cylinder member first end portion of these end portions. The male spline portion is meshed with the female spline portion. The male spline portion includes a male spline first end portion and a male spline second end portion as a pair of end portions of the male spline portion in a direction of a rotational axis of the inner cylinder member. The male spline first end portion is provided at a position closer to the inner cylinder member first end portion than the male spline second end portion is. The inner cylinder member is press-fitted into the outer cylinder member from the inner cylinder member first end portion. Assuming that one and the other of the outer cylinder member and the inner cylinder member are a first shaft member and a second shaft member, respectively, the first shaft member includes a first spline portion that is one of the female spline portion and the male spline portion, the first spline portion includes a first spline first end portion and a first spline second end portion as a pair of end portions of the first spline portion, the first spline first end portion corresponds to one of the female spline first end portion and the male spline first end portion, the first spline second end portion corresponds to the other of the female spline second end portion and the male spline second end portion, the second shaft member includes a second spline portion that is the other of the female spline portion and the male spline portion, the second spline portion includes a second spline first end portion and a second spline second end portion as a pair of end portions of the second spline portion, the second spline first end portion corresponds to one of the female spline first end portion and the male spline first end portion, the second spline second end portion corresponds to the other of the female spline second end portion and the male spline second end portion, the second spline portion includes a second spline tooth tip surface, a second spline tooth root surface, and a crowning portion, and the crowning portion is provided in a predetermined range including the second spline first end portion in the direction of the rotational axis of the second shaft member and the second spline tooth tip surface is shaped in such a manner that a tooth thickness thereof gradually increases from the second spline first end portion toward an intermediate portion of the second spline portion in the direction of the rotational axis of the second shaft member.

According to a further preferable configuration, in the above-described configuration, the first spline portion has such a shape that a longitudinal direction of the first spline portion extends along the direction of the rotational axis of the first shaft member. The second spline portion has such a spline shape that a longitudinal direction of the second spline portion is inclined with respect to the direction of the rotational axis of the second shaft member.

According to another preferable configuration, in any of the above-described configurations, assuming that a first angle is a minor angle of angles sandwiched between an axis extending along the direction of the rotational axis of the second shaft member and an axis extending along the longitudinal direction of the second spline portion in a plane including the second spline tooth tip surface, and a second angle is a minor angle of angles sandwiched between the axis extending along the longitudinal direction of the second spline portion and a tangential line of an outer edge of the crowning portion, the crowning portion is shaped in such a manner that the second angle is larger than the first angle.

According to further another preferable configuration, in any of the above-described configurations, the second spline portion is formed in such a manner that a length of the second spline portion in the direction of the rotational axis of the second shaft member is longer than a length of the first spline portion in the direction of the rotational axis of the first shaft member. The crowning portion is formed in such a manner that an entire range of the crowning portion in the direction of the rotational axis of the second shaft member is located outside the first spline portion with the inner cylinder member press-fitted in the outer cylinder member.

According to further another preferable configuration, in any of the above-described configurations, the second shaft member is the inner cylinder member.

According to further another preferable configuration, in any of the above-described configurations, the inner cylinder member main body portion includes an inner cylinder member taper portion. The inner cylinder member taper portion is provided in a predetermined range including the inner cylinder member first end portion in the direction of the rotational axis of the inner cylinder member, and has such a taper shape that an outer diameter of the inner cylinder member main body portion on the second spline tooth root surface gradually increases from the inner cylinder member first end portion toward the inner cylinder member second end portion.

According to further another preferable configuration, in any of the above-described configurations, the crowning portion is formed in a range not overlapping the inner cylinder member taper portion.

According to further another preferable configuration, in any of the above-described configurations, the second spline portion further includes a second spline taper portion. The second spline taper portion is provided in a predetermined range including the second spline first end portion in the direction of the rotational axis of the second shaft member, and has such a taper shape that an outer diameter of the second spline tooth tip surface gradually increases from the inner cylinder member first end portion toward the inner cylinder member second end portion. The crowning portion is formed in such a manner that a length thereof in the direction of the rotational axis of the second shaft member is longer than a length of the second spline taper portion in the direction of the rotational axis of the second shaft member.

According to further another preferable configuration, in any of the above-described configurations, the second spline tooth tip surface is formed in such a manner that a tooth thickness of the inner cylinder member first end portion is equal to or greater than a predetermined value.

According to further another preferable configuration, in any of the above-described configurations, the second shaft member is made of a seamless pipe with no seam present in a circumferential direction.

Further, from another aspect, a method for manufacturing a power transmission shaft is a method for manufacturing a power transmission shaft provided between a drive source and a drive wheel of a vehicle and configured to transmit a rotational force of the drive source to the drive wheel. The power transmission shaft includes an outer cylinder member. The outer cylinder member includes an outer cylinder member main body portion and a female spline portion. The outer cylinder member main body portion has a cylindrical shape. The outer cylinder member main body portion includes an outer cylinder member first end portion and an outer cylinder member second end portion as a pair of end portions thereof, and the female spline portion is provided on an inner peripheral side of the outer cylinder member main body portion in a predetermined range including the outer cylinder member first end portion of these end portions. The female spline portion includes a female spline first end portion and a female spline second end portion as a pair of end portions of the female spline portion in a direction of a rotational axis of the outer cylinder member. The female spline first end portion is provided at a position closer to the outer cylinder member first end portion than the female spline second end portion is. The power transmission shaft further includes the inner cylinder member. The inner cylinder member includes an inner cylinder member main body portion and a male spline portion. The inner cylinder member main body portion has a cylindrical shape. The inner cylinder member main body portion includes an inner cylinder member first end portion and an inner cylinder member second end portion as a pair of end portions thereof, and the male spline portion is provided on an outer peripheral side of the outer cylinder member main body portion in a predetermined range including the inner cylinder member first end portion of these end portions. The male spline portion can be meshed with the female spline portion. The male spline portion includes a male spline first end portion and a male spline second end portion as a pair of end portions of the male spline portion in a direction of a rotational axis of the inner cylinder member. The male spline first end portion is provided at a position closer to the inner cylinder member first end portion than the male spline second end portion is. Assuming that one and the other of the outer cylinder member and the inner cylinder member are a first shaft member and a second shaft member, respectively, the first shaft member includes a first spline portion that is one of the female spline portion and the male spline portion, the first spline portion includes a first spline first end portion and a first spline second end portion as a pair of end portions of the first spline portion, the first spline first end portion corresponds to one of the female spline first end portion and the male spline first end portion, the first spline second end portion corresponds to the other of the female spline second end portion and the male spline second end portion, the second shaft member includes a second spline portion that is the other of the female spline portion and the male spline portion, the second spline portion includes a second spline first end portion and a second spline second end portion as a pair of end portions of the second spline portion, the second spline first end portion corresponds to one of the female spline first end portion and the male spline first end portion, the second spline second end portion corresponds to the other of the female spline second end portion and the male spline second end portion, and the second spline portion includes a second spline tooth tip surface, a second spline tooth root surface, and a crowning portion. The method for manufacturing the power transmission shaft includes a crowning portion formation step of forming the crowning portion in such a manner that a tooth thickness of the second spline tooth tip surface gradually increases from the second spline first end portion toward an intermediate portion of the second spline portion in the direction of the rotational axis of the second shaft member in a predetermined range including the second spline first end portion in the direction of the rotational axis of the second shaft member, and a press-fitting step of inserting the inner cylinder member first end portion of the inner cylinder member from the outer cylinder member first end portion of the outer cylinder member and press-fitting the inner cylinder member into the outer cylinder member until the female spline portion and the male spline portion are meshed with each other.

Preferably, in the above-described configuration, the crowning portion is formed by hobbing.

According to another preferable configuration, in any of the above-described configurations, the crowning portion formation step is successively performed since a hob used for the hobbing contacts the second shaft member until the hob separates therefrom.

According to further another preferable configuration, in any of the above-described configurations, the crowning portion formation step is performed while a hob used for the hobbing moves from the second spline first end portion in a direction toward the second spline second end portion.

According to further another preferable configuration, in any of the above-described configurations, the second shaft member is the inner cylinder member. The method for manufacturing the power transmission shaft further includes an inner cylinder member taper portion formation step. The inner cylinder member taper portion formation step is a step of forming such an inner cylinder member taper portion that an outer diameter of the inner cylinder member main body portion on the second spline tooth root surface gradually increases from the inner cylinder member first end portion toward the inner cylinder member second end portion in a predetermined range including the inner cylinder member first end portion in the direction of the rotational axis of the inner cylinder member. The crowning portion formation step is performed after the inner cylinder member taper portion formation step is performed.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2018-207843 filed on Nov. 5, 2018. The entire disclosure of Japanese Patent Application No. 2018-207843 filed on Nov.

5, 2018 including the specification, the claims, the drawings, and the abstract is incorporated herein by reference in its entirety.

REFERENCE SIGNS LIST

PS propeller shaft (power transmission shaft)
11 first shaft member
12 second shaft member
112 outer cylinder member
113 female spline portion (first spline portion)
121 inner cylinder member
123 male spline portion (second spline portion)
125 tooth tip surface (second spline tooth tip surface)
126 tooth root surface (second spline tooth root surface)
127 crowning portion
128 inner cylinder member taper portion
129 second spline taper portion
1121 outer cylinder member main body portion
1122 rear end portion (outer cylinder member first end portion)
1123 front end portion (outer cylinder member second end portion)
1131 rear end portion (female spline first end portion, first spline first end portion)
1132 front end portion (female spline second end portion, first spline second end portion)
1211 inner cylinder member main body portion
1212 front end portion (inner cylinder member first end portion)
1213 rear end portion (inner cylinder member second end portion)

The invention claimed is:

1. A propeller shaft provided between a drive source and a drive wheel of a vehicle and configured to transmit a rotational force of the drive source to the drive wheel, the propeller shaft comprising:
   an outer cylinder member, the outer cylinder member including an outer cylinder member main body portion and a female spline portion,
   the outer cylinder member main body portion having a cylindrical shape,
   the outer cylinder member main body portion including an outer cylinder member first end portion and an outer cylinder member second end portion as a pair of end portions thereof, the female spline portion being provided on an inner peripheral side of the outer cylinder member main body portion in a predetermined range including the outer cylinder member first end portion of these end portions,
   the female spline portion including a female spline first end portion and a female spline second end portion as a pair of end portions of the female spline portion in a direction of a rotational axis of the outer cylinder member,
   the female spline first end portion being provided at a position closer to the outer cylinder member first end portion than the female spline second end portion is,
   the outer cylinder member being arranged with an inner cylinder member press-fitted from the outer cylinder member first end portion; and
   the inner cylinder member, the inner cylinder member including an inner cylinder member main body portion and a male spline portion,
   the inner cylinder member main body portion having a cylindrical shape,
   the inner cylinder member main body portion including an inner cylinder member first end portion and an inner cylinder member second end portion as a pair of end portions thereof, the male spline portion being provided on an outer peripheral side of the inner cylinder member main body portion in a predetermined range including the inner cylinder member first end portion of these end portions, the male spline portion being meshed with the female spline portion,
   the male spline portion including a male spline first end portion and a male spline second end portion as a pair of end portions of the male spline portion in a direction of a rotational axis of the inner cylinder member,
   the male spline first end portion being provided at a position closer to the inner cylinder member first end portion than the male spline second end portion is,
   the inner cylinder member being press-fitted into the outer cylinder member from the inner cylinder member first end portion,
   wherein a tooth of the male spline portion is brought into pressure contact with a tooth of the female spline portion circumferentially adjacent thereto to generate a predetermined frictional force, by which the axial position between the outer cylinder member and the inner cylinder member is maintained, and
   wherein, when one and the other of the outer cylinder member and the inner cylinder member are a first shaft member and a second shaft member, respectively,
   the first shaft member includes a first spline portion that is one of the female spline portion and the male spline portion,
   the first spline portion includes a first spline first end portion and a first spline second end portion as a pair of end portions of the first spline portion,
   the first spline first end portion corresponds to one of the female spline first end portion and the male spline first end portion,
   the first spline second end portion corresponds to the other of the female spline second end portion and the male spline second end portion,
   the second shaft member includes a second spline portion that is the other of the female spline portion and the male spline portion,
   the second spline portion includes a second spline first end portion and a second spline second end portion as a pair of end portions of the second spline portion,
   the second spline first end portion corresponds to one of the female spline first end portion and the male spline first end portion,
   the second spline second end portion corresponds to the other of the female spline second end portion and the male spline second end portion,
   the second spline portion includes a second spline tooth tip surface, a second spline tooth root surface, and a crowning portion, and
   the crowning portion is provided in a predetermined range including the second spline first end portion in the direction of the rotational axis of the second shaft member, and the second spline tooth tip surface is shaped in such a manner that a tooth thickness thereof gradually increases from the second spline first end portion toward an intermediate portion of the second spline portion in the direction of the rotational axis of the second shaft member.

2. The propeller shaft according to claim 1, wherein the first spline portion has such a shape that a longitudinal direction of the first spline portion extends along the direction of the rotational axis of the first shaft member, and wherein the second spline portion has such a spline shape that a longitudinal direction of the second spline portion is inclined with respect to the direction of the rotational axis of the second shaft member.

3. The propeller shaft according to claim 2, wherein, when a first angle is a minor angle of angles sandwiched between an axis extending along the direction of the rotational axis of the second shaft member and an axis extending along the longitudinal direction of the second spline portion in a plane including the second spline tooth tip surface, and a second angle is a minor angle of angles sandwiched between the axis extending along the longitudinal direction of the second spline portion and a tangential line of an outer edge of the crowning portion, the crowning portion is shaped in such a manner that the second angle is larger than the first angle.

4. The propeller shaft according to claim 1, wherein the second spline portion is formed in such a manner that a length of the second spline portion in the direction of the rotational axis of the second shaft member is longer than a length of the first spline portion in the direction of the rotational axis of the first shaft member, and wherein the crowning portion is formed in such a manner that an entire range of the crowning portion in the direction of the rotational axis of the second shaft member is located outside the first spline portion with the inner cylinder member press-fitted in the outer cylinder member.

5. The propeller shaft according to claim 1, wherein the second shaft member is the inner cylinder member.

6. The propeller shaft according to claim 5, wherein the inner cylinder member main body portion includes an inner cylinder member taper portion, and wherein the inner cylinder member taper portion is provided in a predetermined range including the inner cylinder member first end portion in the direction of the rotational axis of the inner cylinder member, and has such a taper shape that an outer diameter of the inner cylinder member main body portion on the second spline tooth root surface gradually increases from the inner cylinder member first end portion toward the inner cylinder member second end portion.

7. The propeller shaft according to claim 6, wherein the crowning portion is formed in a range not overlapping the inner cylinder member taper portion.

8. The propeller shaft according to claim 6, wherein the second spline portion further includes a second spline taper portion, wherein the second spline taper portion is provided in a predetermined range including the second spline first end portion in the direction of the rotational axis of the second shaft member, and has such a taper shape that an outer diameter of the second spline tooth tip surface gradually increases from the inner cylinder member first end portion toward the inner cylinder member second end portion, and wherein the crowning portion is formed in such a manner that a length thereof in the direction of the rotational axis of the second shaft member is longer than a length of the second spline taper portion in the direction of the rotational axis of the second shaft member.

9. The propeller shaft according to claim 5, wherein the second spline tooth tip surface is formed in such a manner that a tooth thickness of the inner cylinder member first end portion is equal to or greater than a predetermined value.

10. The propeller shaft according to claim 1, wherein the second shaft member is made of a seamless pipe with no seam present in a circumferential direction.

11. A method for manufacturing a propeller shaft provided between a drive source and a drive wheel of a vehicle and configured to transmit a rotational force of the drive source to the drive wheel, the propeller shaft including an outer cylinder member, the outer cylinder member including an outer cylinder member main body portion and a female spline portion, the outer cylinder member main body portion having a cylindrical shape, the outer cylinder member main body portion including an outer cylinder member first end portion and an outer cylinder member second end portion as a pair of end portions thereof, the female spline portion being provided on an inner peripheral side of the outer cylinder member main body portion in a predetermined range including the outer cylinder member first end portion of these end portions, the female spline portion including a female spline first end portion and a female spline second end portion as a pair of end portions of the female spline portion in a direction of a rotational axis of the outer cylinder member, the female spline first end portion being provided at a position closer to the outer cylinder member first end portion than the female spline second end portion is, the propeller shaft further including an inner cylinder member, the inner cylinder member including an inner cylinder member main body portion and a male spline portion, the inner cylinder member main body portion having a cylindrical shape, the inner cylinder member main body portion including an inner cylinder member first end portion and an inner cylinder member second end portion as a pair of end portions thereof, the male spline portion being provided on an outer peripheral side of the outer cylinder member main body portion in a predetermined range including the inner cylinder member first end portion of these end portions, the male spline portion being able to be meshed with the female spline portion, the male spline portion including a male spline first end portion and a male spline second end portion as a pair of end portions of the male spline portion in a direction of a rotational axis of the inner cylinder member, the male spline first end portion being provided at a position closer to the inner cylinder member first end portion than the male spline second end portion is, wherein a tooth of the male spline portion is brought into pressure contact with a tooth of the female spline portion circumferentially adjacent thereto to generate a predetermined frictional force, by which the axial position between the outer cylinder member and the inner cylinder member is maintained, when one and the other of the outer cylinder member and the inner cylinder member are a first shaft member and a second shaft member, respectively, the first shaft member including a first spline portion that is one of the female spline portion and the male spline portion, the first spline portion including a first spline first end portion and a first spline second end portion as a pair of end portions of the first spline portion, the first spline first end portion corresponding to one of
the female spline first end portion and the male spline
first end portion, the first spline second end portion corresponding to the
other of the female spline second end portion and the
male spline second end portion, the second shaft member including a second spline portion that is the other of the female spline portion and the
male spline portion, the second spline portion including a second spline first
end portion and a second spline second end portion as
a pair of end portions of the second spline portion, the second spline first end portion corresponding to one of
the female spline first end portion and the male spline
first end portion, the second spline second end portion corresponding to the
other of the female spline second end portion and the
male spline second end portion, and the second spline portion including a second spline tooth
tip surface, a second spline tooth root surface, and a
crowning portion, the method for manufacturing the propeller shaft comprising:

a crowning portion formation step of forming the crowning portion in such a manner that a tooth thickness of
the second spline tooth tip surface gradually increases
from the second spline first end portion toward an
intermediate portion of the second spline portion in the
direction of the rotational axis of the second shaft
member in a predetermined range including the second
spline first end portion in the direction of the rotational
axis of the second shaft member; and a press-fitting step of inserting the inner cylinder member
first end portion of the inner cylinder member from the
outer cylinder member first end portion of the outer
cylinder member, and press-fitting the inner cylinder
member into the outer cylinder member until the
female spline portion and the male spline portion are
meshed with each other.

12. The method for manufacturing the propeller shaft
according to claim 11, wherein the crowning portion is
formed by hobbing.

13. The method for manufacturing the propeller shaft
according to claim 12, wherein the crowning portion formation step is successively performed since a hob used for
the hobbing contacts the second shaft member until the hob
separates therefrom.

14. The method for manufacturing the propeller shaft
according to claim 12, wherein the crowning portion formation step is performed while a hob used for the hobbing
moves from the second spline first end portion in a direction
toward the second spline second end portion.

15. The method for manufacturing the propeller shaft
according to claim 11, wherein the second shaft member is
the inner cylinder member,
wherein the method for manufacturing the propeller shaft
further includes an inner cylinder member taper portion
formation step,
the inner cylinder member taper portion formation step
being a step of forming such an inner cylinder member
taper portion that an outer diameter of the inner cylinder member main body portion on the second spline
tooth root surface gradually increases from the inner
cylinder member first end portion toward the inner
cylinder member second end portion in a predetermined range including the inner cylinder member first
end portion in the direction of the rotational axis of the
inner cylinder member, and
wherein the crowning portion formation step is performed
after the inner cylinder member taper portion formation
step is performed.

* * * * *